United States Patent [19]

Dykes et al.

[11] Patent Number: 4,845,168

[45] Date of Patent: Jul. 4, 1989

[54] EXTRUSION OF COMPOSITION OF POLYAMIDE AND EPOXIDE

[75] Inventors: David S. Dykes, Kingston; Klaus D. Kuhnemann, Bath, both of Canada

[73] Assignee: Du Pont Canada Inc., Ontario, Canada

[21] Appl. No.: 206,430

[22] Filed: Jun. 14, 1988

[51] Int. Cl.$^4$ .................. C08G 20/38; C08G 30/10
[52] U.S. Cl. ............................................. 525/423
[58] Field of Search ....................................... 525/423

[56] References Cited

U.S. PATENT DOCUMENTS 4,171,404  10/1979  Carroll ........................... 428/413

FOREIGN PATENT DOCUMENTS

| 788010 | 6/1968 | Canada . |
| 824723 | 10/1969 | Canada . |
| 0194523A | 9/1986 | Canada . |
| 0227053 | 7/1987 | European Pat. Off. . |
| 1253632 | 11/1971 | United Kingdom . |
| 2175305 | 11/1986 | United Kingdom . |

OTHER PUBLICATIONS

Chemical Abstracts 71 92223s (Ciba Ltd.), Nov. 1969.
Chemical Abstracts 81 64684f (Toray), Sept. 1974.

*Primary Examiner*—Harold D. Anderson
*Assistant Examiner*—T. Mason

[57] ABSTRACT

A process for the fabrication of a polyamide article is disclosed, in which a composition of a linear aliphatic polyamide, 0.01–5% by weight of an epoxide and 0.005–1.0% by weight of a catalyst selected from catalysts of the type used in the polymerization of polyamides and epoxide ring-opening compounds is admixed in a manner that provides an effectively uniform admixture and extruded. The epoxide compounds have at least two terminal epoxy groups and a molecular weight of less than 1000. A preferred catalyst is sodium hypophosphite. Increases in melt viscosity of the polyamide in excess of four-fold may be obtained. The compositions may be used in the formation of film by a blown film process, the blow moulding of bottles, thermoforming processes or the like.

24 Claims, No Drawings

EXTRUSION OF COMPOSITION OF POLYAMIDE AND EPOXIDE

The present invention relates to a process for the cross-linking of polyamides, and especially to a process in which compositions of polyamides and epoxides are subjected to extrusion or other melt processing.

Polyamides may be fabricated into a wide variety of products using extrusion, spinning, melt thermoforming and moulding processes. The polyamides used in such processes must have melt processing characteristics that are suitable for the particular process used in fabrication of the product and, in addition, the resultant product must have properties that are commercially acceptable for the intended end-use.

In some instances, property requirements of the fabricated product may lead to difficulties in the operation of the process for fabrication of the product. For example, the properties sought for the product may require that a polyamide of relatively high molecular weight be used whereas the process used to fabricate the product might be capable of being operated more effectively and economically with a polyamide of relatively low molecular weight. Alternatively, requirements of the process may impose characteristics on the polymer that are not necessary and/or may be disadvantageous in the product. In some instances, it may not be economic or even possible to operate the process using the polyamide needed to provide a product with the required product properties. Furthermore, polyamides of high molecular weight tend to be more expensive to manufacture than polyamides of lower molecular weight.

Canadian Pat. No. 788 010 of E. Reichold et al, which issued June 18, 1968 discloses a process for the preparation of high molecular weight cross-linked polyamides in which a cross-linking agent e.g. diepoxycyclohexyl alkane, is added to the melt of a linear polyamide, which is then solidified and then heated at a temperature below the melting point of the polyamide in an inert gas atmosphere containing water vapour. Canadian Pat. No. 824 723 of W. Hechelhammer et al, which issued October 7, 1969 discloses a process for the preparation of stable melts from compositions of linear polyamides having a molecular weight of above 40 000 and 0.1 to 2% by weight of a cross-linking agent selected from epoxy resins, low molecular weight compounds containing epoxy groups and isocyanates. U.K. Pat. No. 1 253 632 of Toray Industries Inc., published Nov. 17, 1971 discloses a process for the manufacture of a polyamide composition in which a thermoplastic linear polyamide is mixed, in the molten state, with a polyepoxy compound that contains a single terminal epoxy group and from one to three vinylene epoxy groups. U.K. Pat. application No. 2 175 305A of H. D. Torre et al, published Nov. 26, 1986 discloses thermoplastic polyamide moulding materials with reduced water uptake that are formed from polyamides and 0.3–15% by weight of epoxides.

A process has now been found for the cross linking of polyamides by extrusion of compositions thereof with epoxides having at least two terminal epoxy groups in the presence of a catalyst to provide polyamides having characteristics of polyamides of higher molecular weight.

Accordingly, the present invention provides a process for the preparation of a polyamide composition comprising feeding to melt processing apparatus a composition comprising (i) a polyamide selected from the group consisting of a linear aliphatic polyamide having from 4 to 24 carbon atoms in the repeating unit of the backbone thereof, and mixtures thereof, (ii) 0.01 to 5 percent, by weight of the polyamide, of an epoxide having at least two terminal epoxy groups and a molecular weight of less than 1000, preferably selected from the group consisting of polyglycol diepoxides, bisphenol-A diepoxides, glycidated novolac epoxides, cycloaliphatic epoxides, triglycidyl ethers, tetraglycidyl ethers, diglycidyl ether of resorcinol, diglycidyl esters and bisphenol-F diepoxides, and (iii) 0.005 to 1.0 percent, by weight of the polyamide, of a catalyst selected from the group consisting of (a) a catalyst of the type used in the polymerization of polyamides, and (b) a compound that is a ring-opener for the epoxy groups of the epoxide; admixing the composition in the melt processing apparatus at temperatures above the melting point of said polyamide so as to provide an effectively uniform admixture thereof prior to significant reaction of epoxide and polyamide; and extruding the resultant composition.

In a preferred embodiment of the process of the present invention, the catalyst is selected from the group consisting of sodium hypophosphite, manganese hypophosphite, orthophosphoric acid, sodium phenyl phosphinate, phosphine/boron trifluoride complex, potassium phosphate and potassium hydroxide, and mixtures thereof.

The present invention also provides a composition comprising (i) a polyamide selected from the group consisting of a linear aliphatic polyamide having from 4 to 24 carbon atoms in the repeating unit of the backbone thereof, and mixtures thereof, (ii) 0.01 to 5 percent, by weight of the polyamide, of an epoxide having at least two terminal epoxy groups and a molecular weight of less than 1000, preferably selected from the group consisting of polyglycol diepoxides, bisphenol-A diepoxides, glycidated novolac epoxides, cycloaliphatic epoxides, triglycidyl ethers, tetraglycidyl ethers, diglycidyl ether of resorcinol, diglycidyl esters and bisphenol-F diepoxides, and (iii) 0.005 to 1.0 percent, by weight of the polyamide, of a catalyst selected from the group consisting of (a) a catalyst of the type used in the polymerization of polyamides, and (b) a compound that is a ring-opener for the epoxy groups of the epoxide.

In preferred embodiments of the composition of the present invention, the catalyst is selected from the group consisting of sodium hypophosphite, manganese hypophosphite, orthophosphoric acid, sodium phenyl phosphinate, phosphine/boron trifluoride complex, potassium phosphate and potassium hydroxide, and mixtures thereof.

The present invention relates to a process for the preparation of polyamide compositions, and for the fabrication of an article from a polyamide composition. The polyamide of the composition is at least one linear aliphatic polyamide having from 4 to 24 carbon atoms in the repeating unit of the backbone of the polyamide. In embodiments, the polyamides are formed by the condensation polymerization of an aliphatic dicarboxylic having 6–12 carbon atoms with an aliphatic primary diamine having 6–12 carbon atoms. Alternatively, the polyamide may be formed by condensation polymerization of an aliphatic lactam or alpha,omega aminocarboxylic acid having 6–12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid) and 1,12-dodecanedioic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid and amino dodecanoic acid. Preferred examples of the polyamides are polyhexamethylene adipamide and polycaprolactam, which are also known as nylon 66 and nylon 6, respectively. Other polyamides are known to those skilled in the art as, for example, nylon 6/10, nylon 11, nylon 12 and nylon 66/6, the latter being a copolymer. Such polyamides are known in the art and may be obtained in a wide variety of molecular weights, depending on the intended end-use of the polyamide.

The polyamide is admixed with an epoxide that has at least two terminal epoxy groups and a molecular weight of less than 1000. In preferred embodiments, the epoxide is selected from the group consisting of polyglycol diepoxides, bisphenol-A diepoxides, glycidated novolac epoxies, cycloaliphatic epoxies, triglycidyl ethers, tetraglycidyl ethers, diglycidyl ether of resorcinol, diglycidyl esters and bisphenol-F diepoxides. The epoxide preferably has two terminal epoxy groups. Such epoxides are known. It is preferred that the epoxide be of relatively low molecular weight viz. a molecular weight of less than 1000 i.e. for diepoxides it is preferred that the epoxide equivalent weight is less than 500, and especially in the range of 150 to 400.

In embodiments of the invention, the epoxide is in the form of a composition, i.e. a concentrate, with an organic material having a melting point lower than that of the polyamide. For example, the organic material may be a polyamide of lower melting point, an amide, a polyolefin, especially a polyolefin that has been grafted with a polar compound e.g. maleic anhydride, acrylic acid, fumaric acid or the like, ethylene/ acrylic acid copolymers, ethylene/methacrylic acid copolymers, an ionomer, a polyamine, ethylene/vinyl acetate copolymers, ethylene/vinyl alcohol copolymers and the like. It is important that the organic material be capable of being admixed with the polyamide so as to form a compatible mixture therewith or, if not compatible with the polyamide, be such that the resultant composition has properties that are acceptable for the intended end-use. Moreover, it is important that the epoxide and organic material are substantially inert with respect to each other, at least at temperatures below the melting point of the polyamide of the composition so as to facilitate mixing of epoxide and polyamide prior to reaction therebetween.

The concentration of epoxide in the organic material may be varied over a wide range that is determined primarily by practical considerations, for example the amount of epoxide that may readily be incorporated into the organic material and the effect of the organic material on the properties of the article fabricated from the polyamide composition. The amount of epoxide may be in the range of 0.01 to 5 percent by weight of the polyamide, preferably 0.1 to 2 percent, and especially in the range of 0.5 to 1.5 percent by weight.

The composition of epoxide and organic material may be prepared using techniques known in the art. For example, the epoxide may be coated onto pellets or other comminuted form of the organic material, the epoxide may be incorporated into the organic material using melt blending techniques, incorporated into a powder of the organic material or encapsulated in the organic material.

The polyamide and epoxide are admixed with 0.005 to 1.0 percent, by weight of the polyamide of the composition, of the catalyst and in particular 0.075 to 0.15 percent by weight of the polyamide. The catalyst may be a catalyst of the type used in the polymerization of polyamides, e.g. acidic and basic catalysts, examples of which are phosphoric acid, hypophosphorous acid, phenylphosphinic acid, manganese hypophosphite, strontium hypophosphite, buffered phenylphosphenic acid, sodium hypophosphite and potassium hydroxide. Alternatively, the catalyst may be a compound that acts as a ring-opening agent for the epoxy ring of the epoxide e.g. boron trifluoride, zinc chloride and zinc acetate. In embodiments, such catalysts are sodium hypophosphite, manganese hypophosphite, orthophosphoric acid, sodium phenyl phosphinate, phosphine/boron trifluoride complex, potassium phosphate and potassium hydroxide, and mixtures thereof. In preferred embodiments, the catalyst is sodium hypophosphite.

In the process of the present invention, the admixture of polyamide, epoxide and catalyst are fed to melt processing apparatus and admixed therein at a temperature above the melting point of the polyamide and above the temperature of reaction of epoxide and polyamide. It is important that the admixing be carried out in a manner that provides an effectively uniform admixture of the components of the composition prior to any significant amount of reaction of epoxide and polyamide. Such admixing may be accomplished using the concentrates in organic material disclosed above and/or use of extruders with excellent mixing capabilities e,.g. twin screw extruders. It may be advantageous, if it is possible, to admix above the melting point of the polyamide but below the reaction temperature and then raise the temperature of the resultant admixture so as to effect reaction. Subsequently, the resultant composition is extruded from the extruder. The extrudate may be in the form of an article, but it is preferred that it is in the form of pellets, granules or other comminuted shapes.

The composition, including the admixture fed to the melt processing apparatus, may contain additives e.g. antioxidants, ultra violet stabilizers, pigments, fillers, toughening agents and the like, as are known for use with polyamides. It will be appreciated by those skilled in the art that such additives should be chosen so as to not adversely affect the fabrication of the articles as described herein to any significant extent, especially the reaction of epoxide and amide groups in the process of the invention.

In embodiments of the process of the present invention, the process may be a process for the extrusion of film using a so-called blown film process, a process for the blow-moulding of articles e.g. bottles, a process for the extrusion of rods or other profiles or a thermoforming process.

The present invention is illustrated by the following examples:

EXAMPLE I

In a series of runs, epoxides were coated onto pellets of nylon 66 in a Henschel ® mixer in an amount such that the ratio of the amount of epoxide, expressed as a percentage by weight, to the epoxide equivalent weight was 0.5:320. In addition, 1000 ppm of sodium hypophosphite were also applied to the pellets, using a 10% by weight aqueous solution. The resultant coated pellets were dried and then extruded through a Welding Engineers 28 mm twin screw extruder and pelletized. The melt viscosity of the product obtained was measured at 280° C. using a Kayeness ® Melt Rheometer equipped with a die having an orifice with a L/D of at least 15.

Further experimental details and the results obtained are given in Table I. The results show that, except in Run 4, the melt viscosity of the polyamide was increased by at least a factor of four over that of the polyamide prior to reaction with epoxide. The epoxide of highest equivalent weight viz. Run 4 where the equivalent weight was 650, gave an unsatisfactory increase in shear viscosity of the nylon 66; it is believed that this is because it is more difficult to disperse epoxides of higher molecular weight in the polyamide.

EXAMPLE II

In order to determine the effect of the type of catalyst, a series of runs were conducted using the procedure of Example I and the epoxide referred to therein as Epoxide A. Each of the catalysts was applied at a concentration of 1000 ppm. The amount of epoxide used was twice that of Example I i.e. the ratio of weight of epoxide to epoxide equivalent weight was 1.0:320.

Further experimental details and the results obtained are given in Table II. The results show that (i) the use of mono- and di-carboxylic acids as catalysts did not cause a significant increase in melt viscosity of the polyamide, and (ii) the use of phosphorus-containing catalysts provided at least a four-fold increase in melt viscosity.

EXAMPLE III

The procedure of Example II was repeated using polyamines as the catalyst, in amounts of 1% by weight.

Further experimental details and the results obtained are given in Table III. The results show that low molecular weight polyamines had relatively little effect in increasing the melt viscosity of the polyamide.

EXAMPLE IV

In a series of runs, blends of nylon 66, the epoxide referred to above as Epoxide A and sodium hypophosphite (SHP) were prepared. The amount of the epoxide was the same as in Example III and the amount of sodium hypophosphite was 1000 ppm. A number of different methods for admixing the epoxide, SHP and nylon were used to prepare the blends.

Further experimental details and the results obtained are given in Table IV. The results show that processes that promote good dispersion of the epoxide molecules into the polymer matrix tend to result in significantly higher melt viscosity in the product obtained, compared with processes in which the epoxide can react readily with the polymer surface prior to being dispersed in the polymer.

EXAMPLE V

A series of runs, including comparative runs, were conducted to illustrate the effect of the amount of epoxide and of sodium hypophosphite (SHP). In all runs, the SHP was fed down the throat of a Werner & Pfleiderer vented 53 mm extruder in the form of a 10% by weight aqueous solution and the epoxide was injected into the melt of the extruder. The epoxide used was the epoxide defined as "A" above.

Further experimental details and the results obtained are given in Table V. The results show that the use of epoxide in combination with SHP resulted in increases in melt viscosity that are greater than the use of epoxide or SHP alone.

EXAMPLE VI

Compositions of the invention were fed to a Kautex ® blow moulding apparatus having a 3.6 kg accumulator head and equipped with a die that was 10 cm in diameter and a screw that had a diameter of 5 cm and an L/D of 20. The mould attached to the apparatus was a bottle mould for the production of bottles having a diameter of 15 cm, a length of 45 cm and a weight of 1.4 kg, using a shot size of at least 1.6 kg.

Bottles were successfully moulded using (a) a composition of nylon 66 containing 0.5% by weight of D.E.R. 732 liquid polyglycol diepoxide and 1000 ppm of sodium hypophosphite which had been dried to a moisture content of 0.033% by weight, that composition having a melt viscosity at 280° C. of 985 Pa.sec at 100 sec$^{-1}$ and 3390 Pa.sec at 3 sec$^{-1}$; and (b) a melt-blend of 10% by weight of maleic anhydride-modified elastomer, 10% by weight of Nordel ® 3681 elastomer and 80% by weight of a composition of nylon 6/6 containing 1.2% by weight of D.E.R. 732 liquid polyglycol diepoxide and 1000 ppm of sodium hypophosphite, the melt-blend having a melt viscosity at 280° C. of 1220 Pa.sec at 100 sec$^{-1}$ and 7000 Pa.sec at 3 sec$^{-1}$; the samples had a moisture content of 0.044% by weight. The composition of (a) had been prepared by extruding the nylon 66 through a 53 mm Werner & Pfleiderer extruder, with the liquid diepoxide and the sodium hypophosphite being fed down the throat of the extruder, the latter in the form of a 10% by weight aqueous solution. The composition of (b) had been prepared in a two-step compounding process on the Werner & Pfleiderer extruder in which the nylon 66 was first extruded, with the liquid diepoxide being injected into a mixing zone in the extruder and a 10% by weight aqueous solution of the sodium hypophosphite being fed down the throat of the extruder i.e. process (c) of Example IV, and then the resultant composition was re-extruded with the remaining constituents, thereby forming the melt-blend that was fed to the blow moulding machine.

EXAMPLE VII

Compositions of the invention were prepared using the procedure of process (c) of Example IV, by feeding D.E.R. 732 liquid polyglycol diepoxide to a mixing zone and 10% by weight aqueous solution of sodium hypophosphite to the throat of a Werner & Pfleiderer 53 mm extruder through which nylon 66 was being extruded. The sodium hypophosphite was used at a level of 1000 ppm and the diepoxide was used at levels of 0.5%, 0.75% and 1% by weight. The compositions were extruded in the form of sheet having a thickness of 250 microns.

The melt viscosity of the compositions that were extruded was measured at 280° C. on samples that had been dried for 24 hours under nitrogen. The results were as follows: (a) for the composition containing 0.5% by weight of diepoxide, 3210 Pa.sec at 100 sec$^{-1}$ and 10800 Pa.sec at 3 sec$^{-1}$, (b) for the composition containing 0.75% by weight of diepoxide, 2080 Pa.sec at 100 sec$^{-1}$ and 8840 Pa.sec at 3 sec$^{-1}$, and (c) for the composition containing 1% by weight of diepoxide, 4450 Pa.sec at 100 sec$^{-1}$ and 21200 Pa.sec at 3 sec$^{-1}$.

The extruded sheet was cut into sections approximately 30 cm×30 cm. These sections were then subjected to a vacuum forming process. All samples showed superior performance to that of a control sample formed from a sheet of the nylon 66 (relative viscosity 50) used in the preparation of the compositions described above. In addition, the sections of sheet prepared from compositions containing 0.75 and 1% by weight of diepoxide showed superior vacuum forming performance to sheet formed from Zytel ® 42 nylon (relative viscosity 240), and were judged to give acceptable vacuum forming performance.

TABLE I

| Run No. | 1 | 2 | 3 | 4 | 5 | 6 |
|---|---|---|---|---|---|---|
| Epoxide* | A | B | C | D | E | F |
| Epoxide Equivalent Weight | 320 | 190 | 165 | 650 | 174 | 176 |
| Melt Viscosity** (Pa.sec) | 1270 | 1420 | 1470 | 710 | 1460 | 1200 |

*A = D.E.R. 732 (Dow Chemicals), a liquid polyglycol diepoxide
B = D.E.R. 736 (Dow Chemicals), a liquid polyglycol diepoxide
C = Heloxy ® MK-107 (Wilmington Chemical Corp.), a liquid cycloaliphatic diepoxide (a diglycidyl ether of cyclohexane-dimethanol)
D = Heloxy ® WC-84 (Wilmington Chemical Corp.), a liquid polyglycol triepoxide (triglycidyl ether of aliphatic polyols)
E = D.E.R. 332 (Dow Chemicals), liquid bisphenol A
F = D.E.R. 351 (Dow Chemicals), a liquid blend of the reaction products of bisphenol A & epichlorohydrin and of bisphenol F & epichlorohydrin
**Measured at 280° C. and 100 sec$^{-1}$. The moisture contents of the samples used in the measurement of melt viscosity were in the range 0.011–0.014% by weight. The melt viscosity of the polyamide subjected to the procedures of Example I in the absence of epoxide and catalyst was 280 Pa.sec (moisture content 0.008%)

TABLE II

| Run No. | 7 | 8 | 9 | 10 | 11 | 12 | 13 |
|---|---|---|---|---|---|---|---|
| Acidic Catalyst* | I | II | III | IV | V | VI | VII |
| Melt Viscosity** (Pa.sec) | 950 | 1500 | 760 | 990 | 830 | 450 | 360 |

*I = sodium hypophosphite
II = manganese hypophosphite
III = potassium hydroxide
IV = potassium phosphate
V = sodium phenylphosphinate
VI = acetic acid
VII = sebacic acid
N.B. catalysts III and VI were applied from a 20% by weight aqueous solution and catalyst VII was applied from a 25% by weight aqueous solution
**Measured at 280° C. and at 100 sec$^{-1}$. The moisture contents of the samples used in the measurement of melt viscosity were in the range 0.030–0.050% by weight. The melt viscosity of the polyamide subjected to the procedures of Example II in the absence of epoxide and catalyst was 185 Pa.sec (moisture content 0.024%)

TABLE III

| Run No. | 14 | 15 | 16 | 17 |
|---|---|---|---|---|
| Catalyst* | VIII | IX | X | XI |
| Melt Viscosity** (Pa.sec) | 460 | 360 | 380 | 220 |

*VIII = Elvamide ® 8061 (Du Pont), a polyamide resin
IX = Versamid ® 100 (Henkel), a polyamide resin (amine value = 85–95)
X = Versamid 140 (Henkel), a polyamide resin (amine value = 370–400)
XI = Versamid 250 (Henkel), an amidoamine resin (amine value = 425–450)
N.B. catalyst VIII was physically admixed with the pellets of nylon, rather than coated onto the pellets, and catalysts IX and X were coated onto the pellets using 25% and 50% by weight solutions, respectively, in isopropanol
**The moisture contents of the samples used in the measurmment of melt viscosity were in the range 0.02–0.04% by weight. The melt viscosity of the polyamide subjected to the procedures of Example III in the absence of catalyst and epoxide was 185 Pa.sec (moisture content 0.014%)

TABLE IV

| | Run No. | | | | | | | | |
|---|---|---|---|---|---|---|---|---|---|
| | 18 | 19 | 20 | 21 | 22 | 23 | 24 | 25 | 26 |
| Method of Preparation* | a | b | c | d | e | f | g | h | i |
| Melt viscosity of blend (280° C., 100 sec$^{-1}$) (Pa.sec) | 1360 | 1220 | 4450 | 1280 | 1080 | 1990 | 2800 | 3100 | 3960 |
| Moisture Content (%) | 0.036 | 0.041 | <0.05 | 0.063 | 0.10 | 0.07 | 0.11 | <0.05 | 0.03 |
| Melt viscosity of nylon (280° C., 100 sec$^{-1}$) (Pa.sec) | 210 | 210 | 275 | 275 | 270 | 190 | 270 | 260 | 210 |
| Moisture content (%) | 0.020 | 0.020 | <0.05 | <0.05 | 0.06 | 0.07 | 0.060 | <0.05 | 0.02 |

*a = surface coating of pellets with epoxide and SHP in Henschel mixer, applying SHP from 10% aqueous solution, and extrusion using Welding Engineers vented 28 mm twin screw extruder
b = surface coating of pellets with SHP from 10% aqueous solution in Henschel mixer, and injecting epoxide down throat of Welding Engineers vented 28 mm twin screw extruder
c = injection of 10% aqueous solution of SHP down throat of extruder of Werner & Pfleiderer vented 53 mm twin screw extruder, and injecting epoxide into high shear zone of the extruder
d = as in method "b", except using the Werner & Pfleiderer extruder
e = surface coating of pellets from 20% aqueous solution of SHP in Henschel mixer, and injecting a 1:3 mixture of epoxide and Jeffamine ED2001 (Texaco) down throat of extruder
f = surface coating of pellets with 20% aqueous solution of SHP in Henschel mixer, and admixing the coated pellets with an intimate blend of epoxide and Elvamide 8061 (1:3), which was prepared by dissolving the epoxide and Elvamide 8061 in methanol, then evaporating the methanol and pelletizing the resultant mixture; the pellets obtained were fed to a Welding Engineers vented 28 mm twin screw extruder; the nylon 6/6 used in this run had a different relative viscosity (RV + ) from the other runs of this Example, in which the polymer had an RV of 50
g = as in "f" except that the nylon 6/6 had an RV of 50
h = a solid bisphenol A epoxide (D.E.R. 661, equivalent weight 530) was admixed with Elvamide 8061 in a ratio of 1:3 by weight using a Gelimat ® high intensity mixer; the resultant blend, in the form of pellets, was admixed with nylon 6/6 and fed to the extruder using the procedure of "f" above
i = as in "c" except that the epoxide was injected into the melt in the first zone of the extruder
N.B. the moisture content of the polymers as subjected to measurement of melt viscosity are reported in the Table

TABLE V

| | Run No. | | | | | | | |
|---|---|---|---|---|---|---|---|---|
| | 27 | 28 | 29 | 30 | 31 | 32 | 33 | 34 |
| Amount of expoxide (%) | 0 | 0 | 1.0 | 2.0 | 1.0 | 1.0 | 2.0 | 2.0 |
| Amount of SHP (ppm) | 500 | 1000 | 0 | 0 | 500 | 1000 | 500 | 1000 |
| Melt viscosity of blend* (Pa.sec) | 530 | 560 | 870 | 1600 | 2590 | 3960 | 5140 | 4470 |

TABLE V-continued

| | Run No. | | | | | | | |
|---|---|---|---|---|---|---|---|---|
| | 27 | 28 | 29 | 30 | 31 | 32 | 33 | 34 |
| Moisture content (%) | 0.010 | 0.007 | 0.007 | 0.006 | 0.026 | 0.03 | 0.010 | 0.021 |
| Relative Viscosity**(RV) | 49.7 | 50.1 | 71.1 | 83.6 | 88.5 | 91.8 | 114.4 | 123.3 |

*the melt viscosity of the nylon subjected to the extrusion procedures of this example in the absence of added epoxide and SHP was 210 Pa.sec, at a moisture content of 0.009% by weight
**relative viscosity was measured in 90% formic acid
NB Runs 26 and 34 are the same run

EXAMPLE VIII

Compositions were prepared from a polyamide, 1% by weight of D.E.R. 732 liquid polyglycol diepoxide and 1000 ppm of sodium hypophosphite using method (b) of Example IV, in a 28 mm twin screw Welding Engineers extruder. Compositions were prepared using a number of different polyamides.

Further experimental details and the results obtained are given in Table VI. The results show that the process of the present invention may be used with a variety of polyamides, although the results obtained may vary from polyamide to polyamide.

TABLE VI

| Run No. | 31 | 32 | 33 | 34 |
|---|---|---|---|---|
| Polyamide* | A | B | C | D |
| Melting Pt (°C.) | 185 | 221 | 220 | 244 |
| Extrusion Temp (°C.) | 200 | 240 | 240 | 240 |
| Melt Viscosity (Pa.sec)** | | | | |
| Measurement Temp.(°C.) | 205 | 240 | 240 | 240 |
| Polymer | 1690 | 880 | 8860 | 460 |
| Mixture | 3520 | 1400 | 9530 | 16600 |

*A = nylon 12/12
B = nylon 6
C = copolymer of nylon 66 (77.5%) and nylon 6
D = copolymer of nylon 66 (90%) and nylon 6
**all measurements were carried out on polymer or mixtures having a moisture content of 0.01% by weight except polymer for Runs 33 and 34 (0.02%) and mixture for Run 34 (0.04%)

EXAMPLE IX

Compositions formed from polyamide, epoxide and catalyst were fed to a Automa Speed 3000M continuous blow moulding machine, in order to illustrate the use of compositions formed in the process of the invention in a blow moulding process. The mould was a bottle mould having a diameter of 8.75 cm and a length of 25 cm.

The compositions were formed on a 53 mm twin screw Werner & Pfleiderer extruder. The epoxide was D.E.R. 732 liquid epoxide which was fed into the molten polymer in the extruder. The catalyst was an aqueous solution of sodium hypophosphite, which was injected down the throat of the extruder.

Sample I was formed using 1% by weight of epoxide and 1000 ppm of catalyst in polyhexamethylene adipamide (nylon 66). The melt viscosity was 1035 Pa.sec (temperature 280° C.) and the moisture content was 0.13%. The composition was judged to have a melt strength that was too low for use in this continuous blow moulding machine. The low melt strength was believed to be due to the high moisture content of the composition.

Sample II was formed using 1.5% by weight of epoxide and 1000 ppm of catalyst in nylon 66. The melt viscosity was 463 Pa.sec (temperature 280° C.) and the moisture content was 0.23%. The high moisture content of the composition resulted in a polymer melt that contained bubbles. In addition, the composition had a melt strength that was too low to produce a moulded bottle of high quality.

Sample III was formed using 0.8% by weight of epoxide and 800 ppm of catalyst and a 80/10/10 mixture of nylon 66, a maleic anhydride-grafted polyolefin compatibilizer and Nordel ® elastomer. The melt viscosity was 4000 Pa.sec (temperature 280° C.) and the moisture content was 0.03%. The melt strength of this composition was acceptable, for the continuous blow moulding process, and high quality bottles were obtained.

Sample IV was formed using 0.9% by weight of epoxide and 900 ppm of catalyst in a melt blend of nylon 66 and Zytel ® 70G33 polyamide (nylon 66 containing 33% by weight of glass fibres) such that the composition contained 10% by weight of glass fibres. The melt viscosity was 3740 Pa.sec (temperature 280° C.) and the moisture content was 0.03%. High quality bottles were obtained.

Sample V was formed using 0.85% by weight of epoxide and 850 ppm of catalyst in a melt blend of nylon 66 and Minlon ® 11C40 polyamide (filled nylon 66 containing 40% mineral filler), such that the composition contained 15% mineral filler. The melt viscosity was 3580 Pa.sec (temperature 280° C.) and the moisture content was 0.02%. Acceptable bottles were obtained.

This example shows that melt viscosity is very sensitive to moisture content of the composition. Compositions should be dried to a moisture content of less than about 0.10%, preferably less than 0.05%, in order to have sufficient melt strength for blow moulding. A variety of compositions suitable for blow moulding are obtainable.

EXAMPLE X

Compositions were prepared using a 83 mm twin screw Werner & Pfleiderer extruder. The mixture fed to the extruder was a polyamide coated with D.E.R. 723 liquid epoxide and sodium hypophosphite that had been prepared in a ribbon blender prior to being fed to the extruder. The resultant compositions were fed to a Sterling blow moulding machine equipped with a 7 kg accumulator head and a 15 cm die. The mould was rectangular in shape and measured 3.8×30×60 cm.

Sample I contained 1.145 by weight of epoxide and 1300 ppm of catalyst in nylon 66. The composition fed to the moulding machine had a melt viscosity of 2260 Pa.sec (temperature 280° C.) and a moisture content of 0.05%. The parison formed in the blow moulding machine at a melt temperature of 267° C. did not have sufficient melt strength to be moulded at a blow-up ratio of 2:1, but it is believed that smaller parts could be blow moulded.

Sample II contained 0.92% by weight of epoxide and 1200 ppm of catalyst in a 80/10/10 blend of nylon 66, grafted polyolefin compatibilizer and Nordel elastomer. The composition fed to the moulding machine has a melt viscosity of 3640 Pa.sec (temperature 280° C.) and a moisture content of 0.05%. The parison had very good melt strength and good quality parts with good surface finish, excellent toughness and pinch strength were obtained.

Sample III contained 0.99% by weight of epoxide and 1100 ppm of catalyst in nylon 66, to which were added 13% by weight of glass fibres during preparation of the composition. The composition fed to the moulding machine had a melt viscosity of 1226 Pa.sec (temperature 280° C.) and a moisture content of 0.05%. The parisons produced at a melt temperature of 272° C. had excellent melt strength. High quality parts showing good surface reproduction, drawability and low warpage were obtained.

This example shows that large parts may be made from compositions of the invention using blow moulding processes.

I claim:

1. A process for the preparation of a polyamide composition comprising feeding to melt processing apparatus a composition comprising (i) a polyamide selected from the group consisting of a linear aliphatic polyamide having form 4 to 24 carbon atoms in the repeating units of the backbone thereof, and mixtures thereof, (ii) 0.01 to 5 percent, be weight of the polyamide, of an epoxide having at least two terminal epoxy groups and a molecular weight of less than 1000, and (iii) 0.005 to 1.0 percent, by weight of the polyamide, of a catalyst selected from the group consisting of (a) an acidic or basic catalyst suitable for the polymerization of monomers to form polyamides, and (b) a compound that is a ring-opener for the epoxy groups of the epoxide; admixing the composition in the melt processing apparatus at temperatures above the melting point of said polyamide so as to provide an effectively uniform admixture thereof prior to significant reaction of epoxide and polyamide; and extruding the resultant composition.

2. The process of claim 1 in which the epoxide is selected from the group consisting of polyglycol diepoxides, bisphenol-A diepoxides, glycidated novolac epoxides, cycloaliphatic epoxides, triglycidyl ethers tetraglycidyl ethers, diglycidyl ether of resorcinol, diglycidyl esters and bisphenol-F diepoxides, said epoxide having at least two terminal epoxy groups.

3. The process of claim 2 in which the catalyst is selected from the group consisting of sodium hypophosphite, manganese hypophosphite, orthophosphoric acid, sodium phenyl phosphinate, phosphine/boron trifluoride complex, potassium phosphate and potassium hydroxide, and mixtures thereof.

4. The process of claim 3 in which the epoxide is in the form of a concentrate in an organic material having a melting point lower than that of the polyamide.

5. The process of claim 3 in which the epoxide equivalent weight is in the range of 150 to 400.

6. The process of claim 3 in which the amount of epoxide is in the range of 0.1 to 2.0 percent by weight of polyamide.

7. The process of claim 5 in which the amount of epoxide is in the range of 0.5 to 1.5 percent by weight of polyamide.

8. The process of claim 3 in which the polyamide has 6–12 carbon atoms in the repeating units in the backbone.

9. The process of claim 8 in which the polyamide is nylon 66 or nylon 6, or a mixture thereof.

10. The process of claim 3 in which the resultant polyamide composition is in the form of an article.

11. The process of claim 3 in which the resultant polyamide composition is in the form of pellets, granules or other comminuted shapes.

12. The process of claim 3 in which the process is a blow moulding process.

13. The process of claim 3 in which the process is an extrusion process.

14. The process of claim 11 in which the resultant polyamide composition is subjected to a blow moulding process.

15. The process of claim 6 in which the catalyst is sodium hypophosphite.

16. A composition comprising (i) a polyamide selected from the group consisting of a linear aliphatic polyamide having from 4 to 24 carbon atoms in the repeating units of the backbone thereof, and mixtures thereof, (ii) 0.01 to 5 percent, by weight of the polyamide, of an epoxide having at least two terminal epoxy groups and a molecular weight of less than 1000, and (iii) 0.005 to 1.0 percent, by weight of the polyamide, of a catalyst selected from the group consisting of (a) an acidic or basic catalyst suitable for the polymerization of monomers to form polyamides, and (b) a compound that is a ring-opener for the epoxy groups of the epoxide.

17. A composition of claim 16 in which the epoxide is selected from the group consisting of polyglycol diepoxides, bisphenol-A diepoxides, glycidated novolac epoxides, cycloaliphatic epoxides, triglycidyl ethers, tetraglycidyl ethers, diglycidyl ether of resorcinol, diglycidyl esters and bisphenol-F diepoxides, said epoxide having at least two terminal epoxy groups.

18. The composition of claim 17 in which the catalyst is selected from the group consisting of sodium hypophosphite, manganese hypophosphite, orthophosphoric acid, sodium phenyl phosphinate, phosphine/boron trifluoride complex, potassium phosphate and potassium hydroxide, and mixtures thereof.

19. The composition of claim 18 in which the epoxide equivalent weight is in the range of 150 to 400.

20. The composition of claim 18 in which the amount of epoxide is in the range of 0.1 to 2.0 percent by weight of polyamide.

21. The composition of claim 20 in which the amount of epoxide is in the range of 0.5 to 1.5 percent by weight of polyamide.

22. The composition of claim 20 in which the polyamide has 6–12 carbon atoms in the repeating units in the backbone.

23. The composition of claim 22 in which the polyamide is nylon 66 or nylon 6, or a mixture thereof.

24. The composition of claim 19 in which the catalyst is sodium hypophosphite.

* * * * *